(12) United States Patent
Nagai et al.

(10) Patent No.: US 12,351,395 B2
(45) Date of Patent: Jul. 8, 2025

(54) SEAL STRUCTURE AND WEIGHING MACHINE COMPRISING SAME

(71) Applicant: YAMATO SCALE CO., LTD., Akashi (JP)

(72) Inventors: Takayuki Nagai, Akashi (JP); Shogo Shimatani, Akashi (JP)

(73) Assignee: YAMATO SCALE CO., LTD., Akashi (JP)

( * ) Notice: Subject to any disclaimer, the term of this patent is extended or adjusted under 35 U.S.C. 154(b) by 448 days.

(21) Appl. No.: 17/910,249

(22) PCT Filed: Mar. 12, 2020

(86) PCT No.: PCT/JP2020/010785
§ 371 (c)(1),
(2) Date: Sep. 8, 2022

(87) PCT Pub. No.: WO2021/181602
PCT Pub. Date: Sep. 16, 2021

(65) Prior Publication Data
US 2023/0091619 A1 Mar. 23, 2023

(51) Int. Cl.
*B65G 27/08* (2006.01)
*F16J 15/52* (2006.01)
*G01G 19/393* (2006.01)
*G01G 21/30* (2006.01)

(52) U.S. Cl.
CPC ........... *B65G 27/08* (2013.01); *G01G 19/393* (2013.01); *G01G 21/30* (2013.01); *F16J 15/52* (2013.01)

(58) Field of Classification Search
CPC ...... G01G 19/393; G01G 21/28; G01G 21/30; F16J 15/52; F16J 15/525; B65G 27/08; B65G 27/06
See application file for complete search history.

(56) References Cited

U.S. PATENT DOCUMENTS

| | | | | |
|---|---|---|---|---|
| 5,773,765 A | * | 6/1998 | Sashiki | ................. B65G 27/08 177/25.18 |
| 6,037,549 A | * | 3/2000 | Weck | ................. G01G 19/393 222/196 |

FOREIGN PATENT DOCUMENTS

| | | |
|---|---|---|
| JP | 54-180120 U | 12/1979 |
| JP | S57-51063 A | 3/1982 |
| JP | 58-085529 U | 6/1983 |
| JP | 2014-235141 A | 12/2014 |

OTHER PUBLICATIONS

Computer translation of JP 2014-235141 downloaded from the JPO website on Jan. 23, 2025.*

* cited by examiner

*Primary Examiner* — Randy W Gibson
(74) *Attorney, Agent, or Firm* — Norris McLaughlin, P.A.

(57) ABSTRACT

A sealing structure is provided that includes a sealing member having an annular shape and elastically deformable. The sealing member is interposed between a top plate of a cabinet mounted with a vibrator and a vibrating head of the vibrator disposed in a manner that protrudes upward out of an opening of the top plate. The sealing member includes an upper coupler, an intermediate coupler continuous to the upper coupler, and a lower coupler continuous to the intermediate coupler. The upper coupler is couplable to an upper part of the vibrating head, the intermediate coupler is couplable to the top plate, and the lower coupler is couplable to a lower part of the vibrating head.

10 Claims, 9 Drawing Sheets

SEAL STRUCTURE AND WEIGHING MACHINE COMPRISING SAME

TECHNICAL FIELD

This invention relates to a sealing structure suitable for transport mechanisms driven to vibrationally transport target articles, and a weighing machine or apparatus equipped with such a sealing structure.

BACKGROUND ART

An example of the conventional combination scales used to weigh articles, which is described in Patent Literature 1, includes a center base body and a dispersion feeder and linear feeders disposed in an upper part of the center base body. The dispersion feeder radially disperses and transports, through vibrations, the articles supplied from above. The linear feeders receive the articles dispersed and supplied from the dispersion feeder and respectively transport the received articles further outward. The combination scale is further equipped with a plurality of feeding hoppers and a plurality of weighing hoppers. The feeding hoppers and the weighing hoppers are disposed in the outer circumference of the center base body. The feeding hoppers temporarily retain the articles ejected and received from the linear feeders. The weighing hoppers temporarily retain the articles ejected and received from the feeding hoppers and then weigh the retained articles.

In the combinations scales, combinatorial computations are executed based on the weights of articles in the weighing hoppers to select a combination of these hoppers containing the articles having a summed weight that falls within a predetermined range of weights. Then, the gates of the selected hoppers are opened to discharge the articles out of these hoppers. The discharged articles are guided along a collection chute and collected toward the center of the base body and then thrown into a packaging apparatus disposed further down below.

Such combination scales of the known art need to be washed and cleaned at times to remove any crumbs or flakes of the articles handled in these scales. In combination scales used to weigh foodstuffs, in particular, cleaning is indispensably required; cleaning at regular intervals, and also cleaning whenever necessary for such instances as any change of types of food to be weighed.

During the cleaning operation, cleaning water used then possibly penetrates into the center base body mounted with the dispersion feeder and linear feeders. This may adversely affect the electric devices used in the feeders, possibly leading to malfunction or breakdown. The combination scales are, therefore, typically equipped with structural features for sealing that can prevent the water penetration into their center base bodies.

The center base body is conventionally mounted with vibrators for the dispersion feeder and for the linear feeders to vibrationally transport articles to be delivered. The vibrators each have a vibrating head disposed in a manner that protrudes upward out of an opening formed in the top plate of the center base body. To these exposed heads of the vibrators are coupled the top cone of the dispersion feeder and the troughs of the linear feeders.

In FIG. 12 is illustrated a sealing structure C of the known art used for the linear feeders. A center base body 31 has a top plate 31a and is mounted with a vibrator 30 having a vibrating head 33. The top plate 31a has an opening 32, and the vibrating head 33 is disposed in a manner that protrudes upward out of the opening 32. The troughs of the linear feeders (not illustrated in the drawing) are detachably mounted to the vibrating head 33. The vibrating head 33 is covered with a sealing member; annular bellows 35 made of a soft rubber material. The bellows 35 has an annular upper end 35a and an annular lower end 35b. The upper end 35a is coupled to and supported by an upper part of the vibrating head 33. The lower end 35b is coupled to and supported by the top plate 31a. Thus, cleaning water may be prevented from advancing inward through the opening 32, with the vibrating head 33 being allowed to vibrationally displace deform by elastic deformation of the bellows 35.

CITATION LIST

Patent Literature

Patent literature 1: JP 2014-235141A

SUMMARY OF INVENTION

Technical Problem

For cleaning, the troughs and the top cone are conventionally removed from the vibrating heads of the vibrators. At that time, the troughs and/or the top cone may be accidentally hit against the bellows and damaged. This risk may increase with any combination scales in which a large number of linear feeders are circularly arranged in proximity, because the troughs of these feeders, unless they are carefully removed, are more likely to bump the bellows nearby. If an excessively large impact is generated then, the bellows may possibly crack to an extent that undermines a desirable waterproof effect.

The surface of the bellows, if not so damaged to crack, may be more or less flawed or scratched. As the combination scale is run time after time, the bellows may continue to elastically deform, possibly widening the flaw or scratch into a crack(s).

This invention was accomplished to address these issues of the known art and is directed to providing a sealing structure that can achieve a remarkable waterproofness when a sealing member, like bellows, happens to be damaged. This invention is also directed to providing a weighing apparatus equipped with such a sealing structure.

Technical Solution

To this end, this invention provides the following technical features.

1] A sealing structure according to this invention includes a sealing member having an annular shape and elastically deformable. The sealing member is interposed between a top plate of a cabinet mounted with a vibrator and a vibrating head of the vibrator disposed in a manner that protrudes upward out of an opening of the top plate. The sealing member includes an upper coupler, an intermediate coupler continuous to the upper coupler, and a lower coupler continuous to the intermediate coupler, the upper coupler being couplable to an upper part of the vibrating head, the intermediate coupler being couplable to the top plate, the lower coupler being couplable to a lower part of the vibrating head.

In the sealing member of this sealing structure, its upper coupler is coupled to an upper part of the vibrating head and its intermediate coupler is coupled to the top plate, and a portion of the sealing member along its couplers; upper to intermediate coupler, is exposed. This portion thus exposed may be easily damaged under a certain impact against any other member. To avoid the risk, the intermediate coupler coupled to the top plate is extended and thereby becomes continuous to the lower coupler coupled to the lower part of the vibrating head.

Thus, the sealing member has a double sealing mechanism; one is an outer sealing including a portion from the upper coupler coupled to the upper part of the vibrating head to the intermediate coupler coupled to the top plate, and the other is an inner sealing including a portion from the intermediate coupler coupled to the top plate to the lower coupler coupled to the lower part of the vibrating head. Supposing that any member or object hits and damage the outer sealing of the sealing member, cleaning water may possibly leak through the damaged part. Yet, the sealing member further has the inner sealing from its intermediate coupler coupled to the top plate to its lower coupler coupled to the lower part of the vibrating head. This inner sealing may effectively prevent the cleaning water from further advancing into the cabinet.

2] In a preferred embodiment of this invention, the sealing member includes a bulging portion deformable outward between the upper coupler and the intermediate coupler.

According to this embodiment, the sealing member has a bulging portion between the upper coupler coupled to the upper part of the vibrating head and the intermediate coupler coupled to the top plate. The bulging portion is deformed and curved outward in response to any vibration displacement of the vibrating head. Thus, vibrations of the vibrating head may be absorbed well and prevented from transmitting to the top plate of the cabinet.

3] In an embodiment of this invention, the sealing member has a deformable bent portion between the intermediate coupler and the lower coupler.

According to this embodiment, the sealing member has a deformable bent portion between the intermediate coupler coupled to the top plate and the lower coupler coupled to the lower part of the vibrating head. This deformable bent portion is allowed to deform in response to any vibration displacement of the vibrating head. Thus, the vibrations may be successfully prevented from transmitting to the top plate of the cabinet. Also, the bent portion thus easily deformable may effectively reduce a drive load of the vibrating head resulting from resistance to deformation of the sealing member.

4] In other embodiments of this invention, the deformable bent portion is a groove.

According to the embodiments, the deformable bent portion in the form of a groove may not only absorb the vibrations but also retain cleaning water that accidentally leaked in, thus preventing the cleaning water from running toward the vibrating head.

5] In further embodiments of this invention, the sealing member is made of a transparent or translucent material.

According to the embodiments, whether cleaning water has penetrated beyond the sealing member may be visually checked from outside. Such a visual check may allow an operator to correctly and precisely know whether the damaged sealing member invited the water penetration or whether the sealing member should be replaced. Thus, the maintenance work may be better performed.

6] In an embodiment of this invention, the top plate of the cabinet partly includes a raised portion, and the intermediate coupler of the sealing member is coupled to an upper surface of the raised portion.

According to this embodiment, the sealing member is thus attached to the raised portion of the top plate. This may facilitate cleaning of the upper surface of the top plate; washing or wiping, without any contact with the sealing member.

7] A weighing apparatus according to this invention includes a center base body including a top plate and used as a cabinet, a dispersion feeder, and a plurality of linear feeders each having a trough, the dispersion feeder and the linear feeders being disposed in an upper part of the center base body. The dispersion feeder radially disperses and transports articles, and the linear feeders transport, further outward, the articles dispersed and transported by the dispersion feeder. The weighing apparatus further includes a plurality of feeding hoppers and a plurality of weighing hoppers that are disposed in an outer circumference of the center base body. The feeding hoppers temporarily retain and then discharge the articles received from the linear feeders, and the weighing hoppers retain and weigh the articles discharged from the feeding hoppers. The center base body is mounted with a vibrator for the linear feeders, the vibrator having a vibrating head disposed in a manner that protrudes upward out of an opening of the top plate. The troughs of the linear feeders are mounted to the vibrating head of the vibrator. The weighing apparatus further includes the sealing structure described in one of 1] to 6] in which the sealing member is interposed between the vibrating head of the vibrator for the linear feeders and the top plate of the center base body.

In a conventional weighing apparatus in which a large number of linear feeders are arranged in proximity, the troughs of these feeders may often bump the sealing member nearby when they are removed. In the weighing apparatus further including the double sealing structure according to this invention, cleaning water, if it leaks in through any damaged part of the sealing member, may be effectively prevented from further advancing into the center base body (cabinet). This may ensure a trouble-free weighing operation of the weighing apparatus that can run for a long duration of time.

8] In a preferred embodiment of this invention, the center base body is mounted with a vibrator for the dispersion feeder, the vibrator having a vibrating head disposed in a manner that protrudes upward out of the opening of the top plate. The top cone of the dispersion feeder is mounted to the vibrating head of the vibrator. The weighing apparatus further includes the sealing structure described in one of 1] to 6] in which the sealing member is interposed between the vibrating head of the vibrator for the dispersion feeder and the top plate of the center base body.

An operator, who wants to remove from a weighing apparatus the top cone located at the upper center of the center base body, has to reach out across the outer circumference of the center base body to the relatively large and heavy top cone. At the time, the operator may accidentally drop the top cone and damage the sealing member. According to this embodiment, the double sealing mechanism; inner sealing and outer sealing, is offered by just one sealing member. Thus, cleaning water, if it leaked in through any damaged part of the sealing member, may be effectively prevented from further advancing into the center base body (cabinet). This may ensure a trouble-free weighing operation of the weighing apparatus that can run for a long duration of time.

Effects of the Invention

This invention may successfully provide a sealing structure that can promise a remarkable waterproofness despite any damage to the sealing member, and a weighing apparatus equipped with the sealing structure.

BRIEF DESCRIPTION OF THE DRAWINGS

FIG. 12 is a longitudinal cross-sectional view of a sealing structure of the known art.

DESCRIPTION OF EMBODIMENTS

Embodiments of this invention are hereinafter described in detail with reference to the accompanying drawings.

Figure 1:
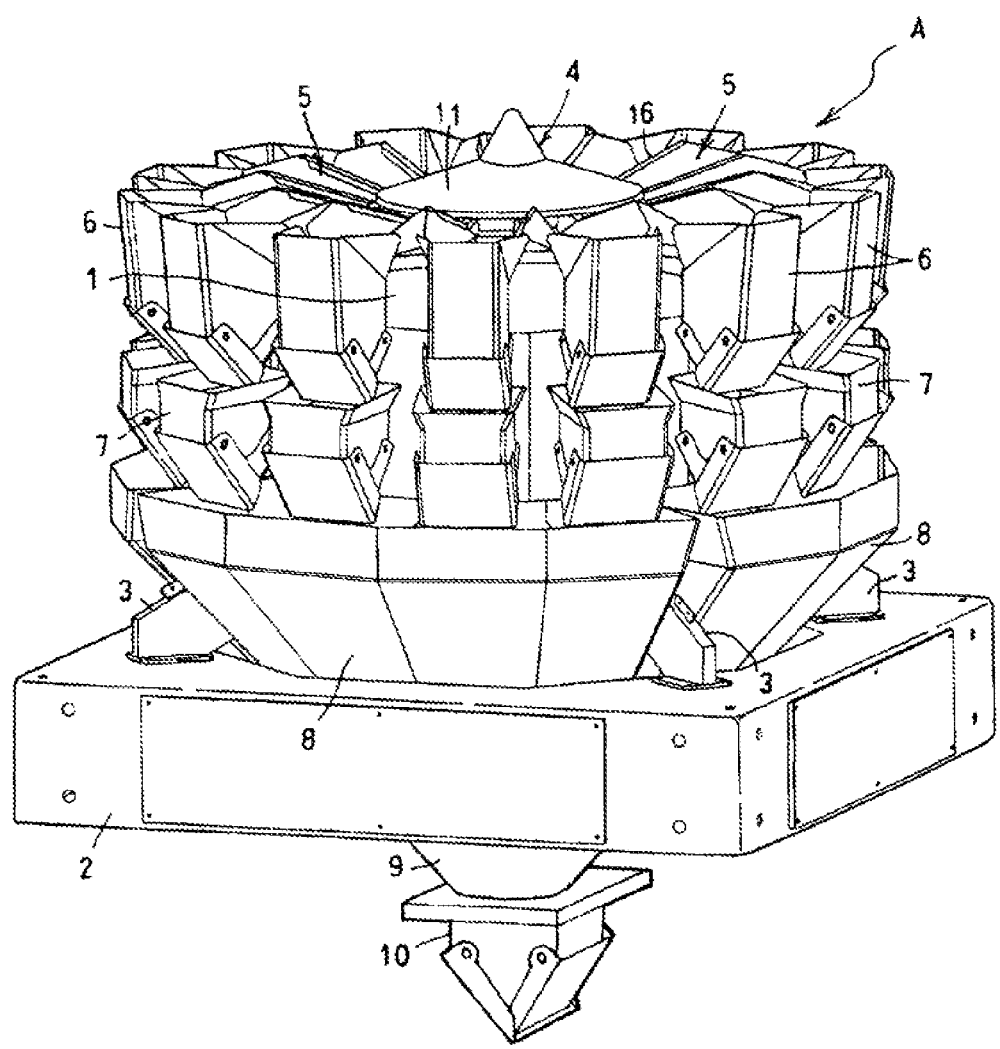
FIG. 1 is a perspective view, illustrating the external appearance of a combination scale; an exemplified weighing apparatus according to an embodiment of this invention.
Figure 2:
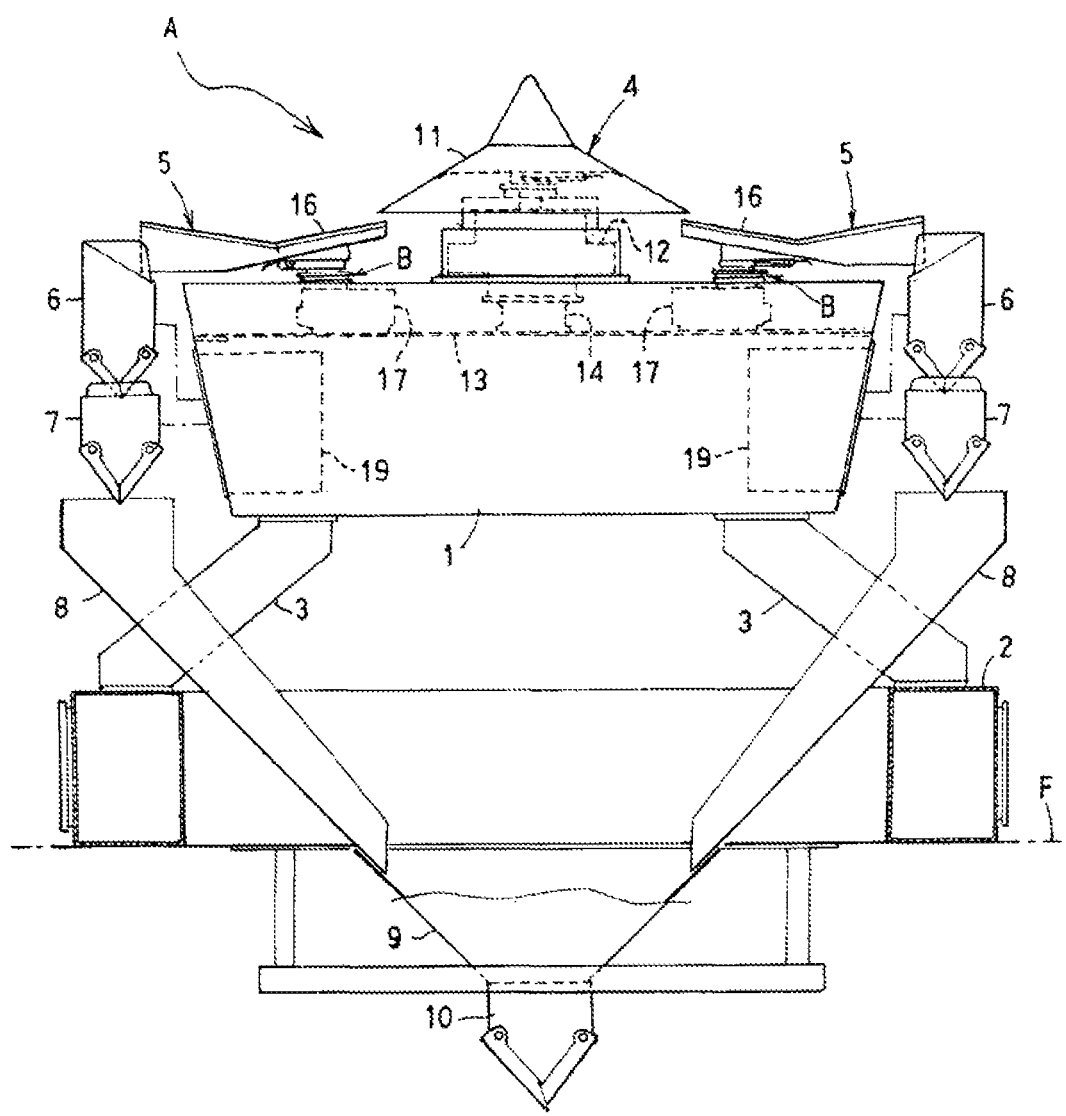
FIG. 2 is a longitudinal cross-sectional view, schematically illustrating the combination scale of FIG. 1.

FIG. 1 is a perspective view, illustrating the external appearance of a combination scale A; an exemplified weighing apparatus. FIG. 2 is a longitudinal cross-sectional view, schematically illustrating the combination scale A.

This combination scale A may be used in a packaging line in which articles, for example, snacks, sweets or any other foodstuffs are weighed, and the articles having a certain weight that falls within a predetermined range of weights are discharged and thrown into a packaging apparatus below, not illustrated in the drawings, and then packed into bags.

The combination scale A is so structured that a substantially columnar center base body 1 is supported on a pedestal 2 at the center of this scale through a plurality of (four in the illustrated example) leg portions 3. The pedestal 2 is placed on a floor surface F, as illustrated in FIG. 2. This pedestal has an opening in which a lower part of the combination scale A is insertable.

A dispersion feeder 4 is disposed in the upper direction of the center base body 1. The dispersion feeder 4 receives the articles dropping from a feeder not illustrated in the drawings and transports the received articles by radially dispersing them through vibrations. A plurality of (14 in the illustrated example) linear feeders 5 are disposed around the dispersion feeder 4. These linear feeders 5 receive the articles from the dispersion feeder 4 and vibrationally transports the articles outward. This combination scale further has, beneath the ends of the linear feeders 5, feeding hoppers 6 and weighing hoppers 7 that are disposed correspondingly to the linear feeders 5. A plurality of (14 in the illustrated example) weighing units each containing the linear feeder 5, feeding hopper 6 and weighing hopper 7 are circularly arranged around the center base body 1.

A collection chute 8 is disposed at a position below the weighing hoppers 7 that are circularly arranged. The collection chute 8 receive the articles discharged from an optimal combination of weighing hoppers containing the articles having a summed weight that falls within a predetermined range of weights. At a position below the collection chute 8 is disposed a collection funnel 9 that collects the articles dropping from the collection chute 8. A collection hopper 10 is disposed below the collection funnel 9. The collection hopper 10 receives and retains the articles dropped and collected along the collection funnel 9 toward the center and then discharges the articles based on an article discharge request from the packaging apparatus.

The dispersion feeder 4 includes a top cone 11 to which the articles are supplied and further includes an electromagnetic vibrator 12 driven to vibrate the top cone 11. The vibrator 12 is coupled to a center part of a support frame 13 with a weight sensor 14 being interposed therebetween.

The linear feeders 5 each have a trough (feeder pan) 16 that extends to and from inner and outer sides of the scale and also have an electromagnetic vibrator 17 driven to vibrate the trough. The vibrators 17 are supportably mounted to the support frame 13 in the center base body 1 in a manner that surround the vibrator 13 for the dispersion feeder 5.

Figure 3:
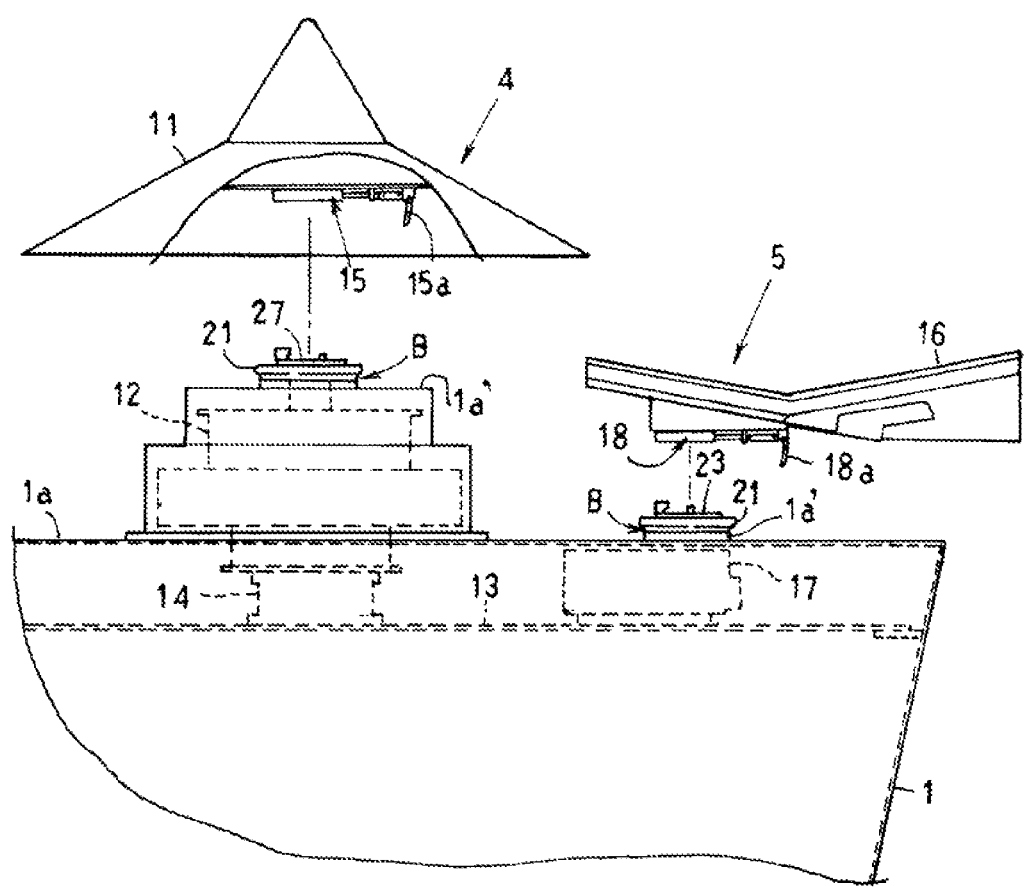
FIG. 3 is a longitudinal cross-sectional view of the combination scale from which the top cone of a dispersion feeder and troughs of linear feeders have been removed.
Figure 4:
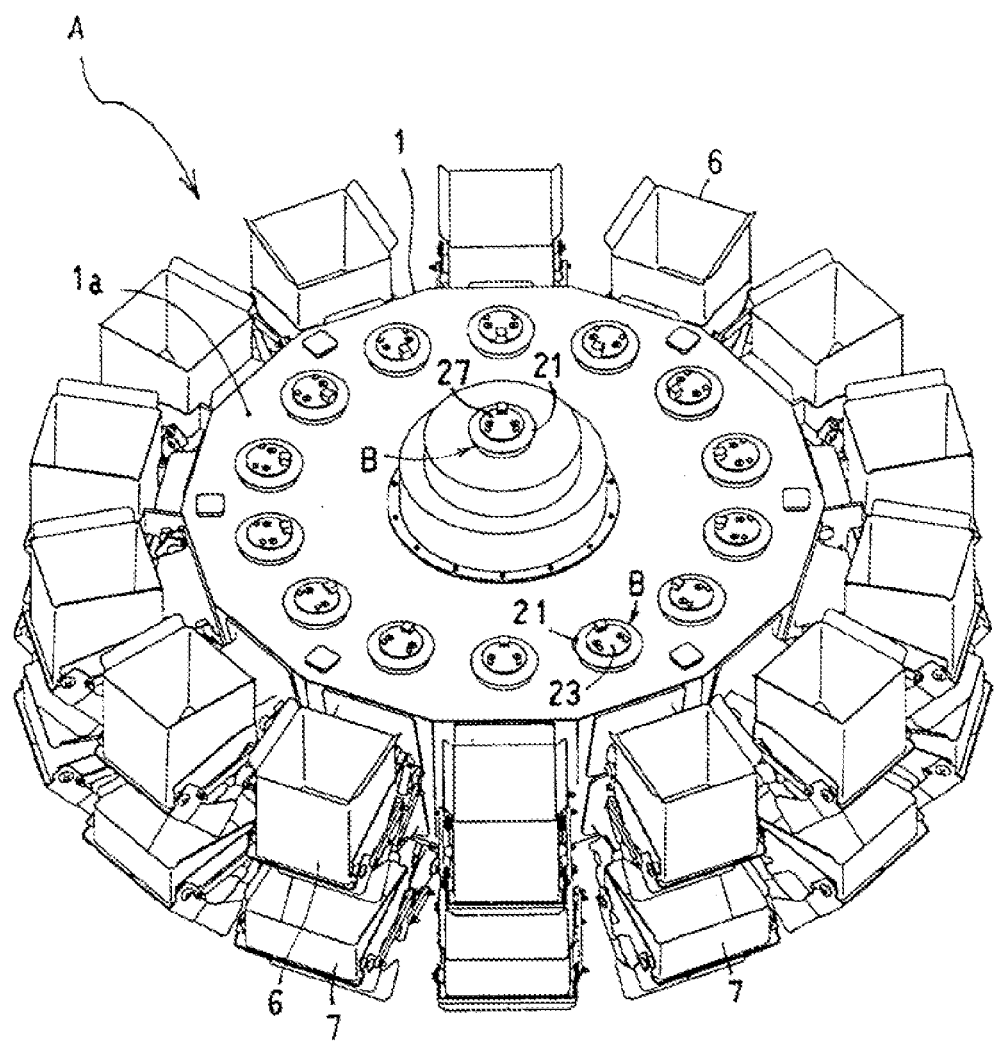
FIG. 4 is a perspective view, illustrating a center base body from which the top cone and the troughs have been removed.

FIG. 3 is a longitudinal cross-sectional view of the combination scale from which the top cone 11 of the dispersion feeder 4 and the troughs 16 of the linear feeders 5 have been removed. FIG. 4 is a perspective view of the center base body 1 from which the top cone 11 and the troughs 16 have been removed.

In the tope cone 11 of the dispersion feeder 4 is installed a buckle-type coupling jig 15 having an operation lever 15a. The top cone 11 is fixedly couplable to or decouplable from the vibrator 12 in the following manner; first, the coupling jig 15 is located to and engaged with an exposed upper part of the vibrator 12, and the operation lever 15a is then oscillated upward or downward beyond the dead center.

The linear feeders 5 each have, on its bottom lower surface, a buckle-type coupling jig 18 having an operation lever 18a. The trough 16 of the linear feeder 5 is fixedly couplable to or decouplable from the vibrator 17 in the following manner; first, the coupling jig 18 is located to and engaged with an exposed upper part of the vibrator 17, and the operation lever 18a is then oscillated upward or downward beyond the dead center.

As illustrated in FIG. 2, the center base body 1 has, in its outer circumference, driving units 19 driven to open and close the gates of the feeding hoppers 6 and weighing hoppers 7. In the center base body 1, weight sensors, like load cells, are also housed in the center base body 1 in addition to the driving units 19. The weight sensors are used to measure the weights of articles in the weighing hoppers 7.

The weight sensor 14 detects the weight of articles in the top cone 11 of the dispersion feeder 4. Thus, the supply of articles into the dispersion feeder 4 is controlled, so that the top cone 11 is constantly supplied with the articles of a weight that falls within a certain range of weights.

In view of hygiene, combination scales used to weigh foodstuffs should desirably be cleaned on a frequent basis. The combination scale A according to this embodiment has, in its portion mounted with the dispersion feeder 4 and the linear feeders 5, a sealing structure B serving to prevent the penetration of cleaning water into the center base body 1.

Figure 5:
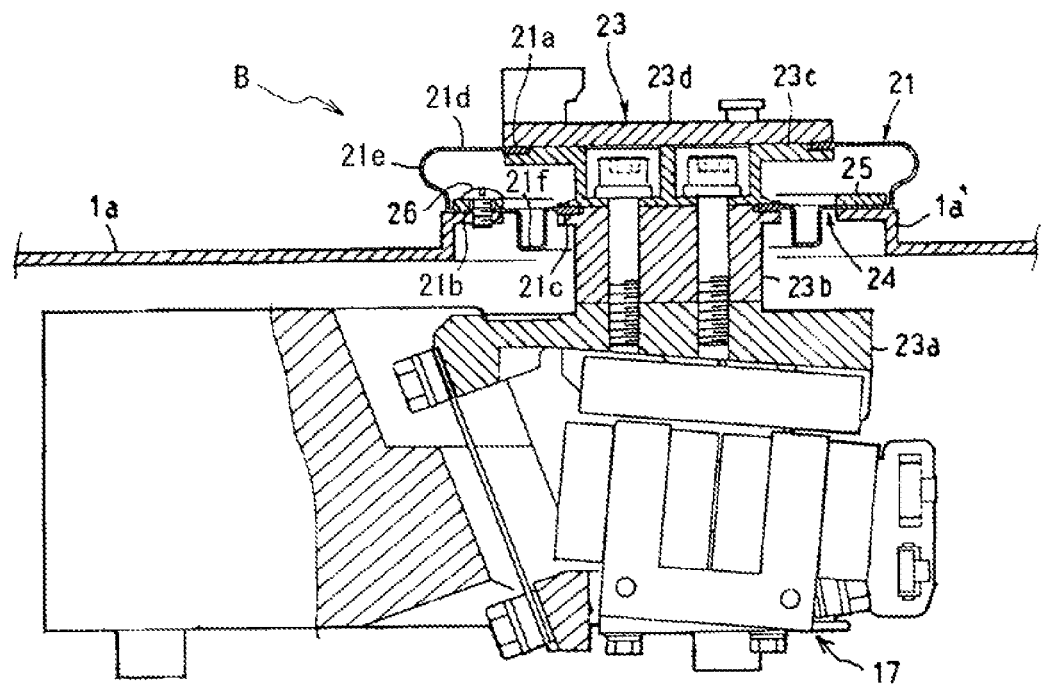
FIG. 5 is a longitudinal cross-sectional view, illustrating a sealing structure for the linear feeders.
Figure 6:
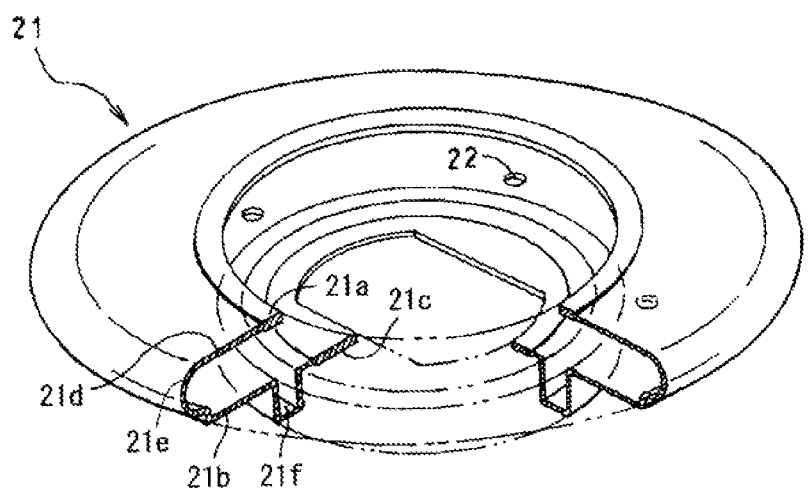
FIG. 6 is a partly broken, perspective view of a bellows; an exemplified sealing member used in the sealing structure.
Figure 7:
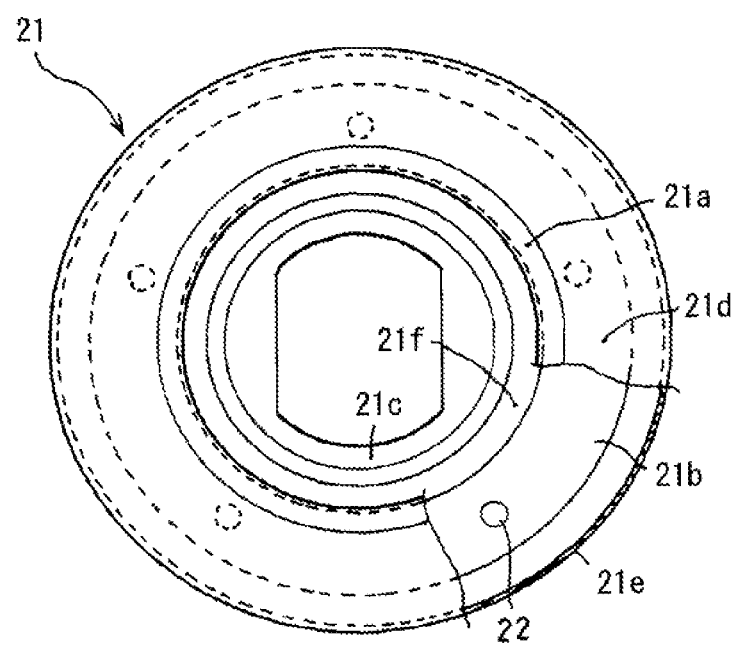
FIG. 7 is a partly broken, plan view of the bellow.
Figure 8:
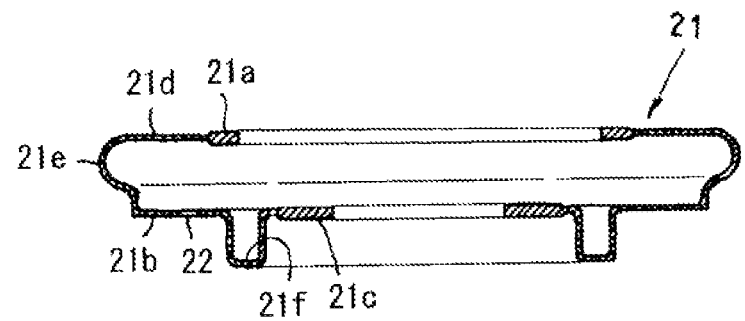
FIG. 8 is a longitudinal cross-sectional view of the bellows.

FIG. 5 is a longitudinal cross-sectional view of the sealing structure B for the linear feeders 5. FIG. 6 is a partly broken, perspective view of a bellows; an exemplified sealing member used in the sealing structure B. FIG. 7 is a partly broken, plan view of the bellows. FIG. 8 is a longitudinal cross-sectional view of the bellows.

The sealing structure B according to this embodiment uses, as a sealing member, an annular bellows 21. The annular bellows 21 is made of a transparent rubber material, an example of which is a silicon rubber easy to elastically deform. This bellows 21 includes annular coupling portions; an upper coupler 21a, an intermediate coupler 21b continuous to the upper coupler 21a, and a lower coupler 21c continuous to the intermediate coupler 21b. The upper coupler 21a is couplable to an upper part of a vibrating head 23 of the vibrator 17. The intermediate coupler 21b is couplable to the top plate 1a of the center base body 1. The lower coupler 21c is couplable to a lower part of the vibrating head 23.

The upper coupler 21a is a thick portion formed at a center-side upper edge of the annular bellows 21 (inner upper edge). The lower coupler 21c is a thick portion formed at a center-side lower edge of the annular bellows 21 on the center side (inner lower edge).

The intermediate coupler 21b is formed in a flat shape along the top plate 1a of the center base body 1. This intermediate coupler 21b has a plurality of (five in the illustrated example) coupling holes 22. These coupling holes 22 are circumferentially formed at a constant pitch and are used to couple the intermediate coupler 21b to the top plate 1a of the center base body 1.

A bulging portion 21e; easily elastically deformable portion, is annularly formed between the intermediate coupler 21b and a flat upper surface portion 21d extending outward from the upper coupler 21a. The bulging portion 21e is deformed and curved outward in the illustrated example.

The intermediate coupler 21b extends from a lower part of the bulging portion 21e toward the center (inward) of the annular bellows 21. A groove 21f, which is an example of the elastically deformable portion, is annularly formed between the intermediate coupler 21b and the lower coupler 21c.

The vibrating head 23 of the vibrator 17 is electromagnetically driven and vibrationally displaceable. The trough-mounting portion of the top plate 1a of the center base body 1 is raised to a higher level than the other portions, constituting a top plate raised portion 1a'. The top plate raised portion 1a' has an opening 24 formed in its upper surface, and the vibrating head 23 is disposed in a manner that protrudes upward out of the opening 24. The vibrating head 23 includes a vibrating body 23a, a first support member 23b, a second support member 23c, and an engageable coupling member 23d. The vibrating body 23a is electromagnetically driven and thereby vibrated at a predetermined frequency and amplitude. The first support member 23b is coupled onto the vibrating body 23a. The second support member 23c is coupled onto the first support member 23b.

The engageable coupling member 23d is coupled onto the second support member 23c. The lower coupler 21c of the bellows 21 is coupled to and held between the first support member 23b and the second support member 23c. The upper coupler 21a of the bellows 21 is coupled to and held between the second support member 23c and the engageable coupling member 23d. The intermediate coupler 21b of the bellows 21 is held between push rings 25 embedded in the bellows 21 and the upper surface of the top plate raised portion 1a'. Screws 26 are inserted through the push rings 25 and the coupling holes 22 and then fastened into the top plate raised portion 1a' to fixedly couple the intermediate coupler 21b of the bellows 21 to the top plate raised portion 1a'.

In the sealing structure B thus characterized, the bulging portion 21e of the bellows 21 elastically deforms in response to any vibration displacement of the vibrating head 23. This may absorb vibrations of the vibrating head 23, thus preventing the vibrations from transmitting to the top plate 1a.

Likewise, the groove 21f is elastically deformable upon any vibration displacement of the vibrating head 23, which may also conduce to the absorption of the vibrations of the vibrating head 23.

The exposed upper surface portion 21d and bulging portion 21e may involve the risk of contact with any other member or object. Such a contact may possibly damage and generate a crack(s) in these portions, which possibly invites cleaning water to penetrate into the bellows 21. In the sealing structure B described herein, the intermediate coupler 21b coupled to the top plate raised portion 1a' extends, through the groove 21f, to the lower coupler 21c coupled to the lower part of the sealing structure B. This sealing structure, therefore, offers a double sealing mechanism; one is an outer sealing including the exposed upper surface portion 21d and bulging portion 21e and a portion from the bulging portion 21a to the intermediate coupler 21b, and an inner sealing including a portion from the intermediate coupler 21b to the lower coupler 21c through the groove 21f.

Possibly, cleaning water may be invited inward as a result of any damage to the bulging portion 21e and/or the upper surface portion 21d of the outer sealing. Yet, the inner sealing is further provided that includes a portion from the intermediate coupler 21b to the lower coupler 21c through the groove 21f. This inner sealing may effectively prevent the cleaning water from further penetrating into the center base body 1. The cleaning water, if it penetrated into the bellows 21, may be retained inside the groove 21g.

The bellows 21 made of a transparent rubber material may allow the inside to be easily looked in, and whether the groove 21g is containing the cleaning water may be checked in a timely manner. This may lead to quick decision on whether there is any damage to the bellows 21 or whether the bellows 21 should be replaced.

The material of the bellows is not necessarily selected from silicon rubbers and may be selected from translucent materials including EPDM.

Figure 9:
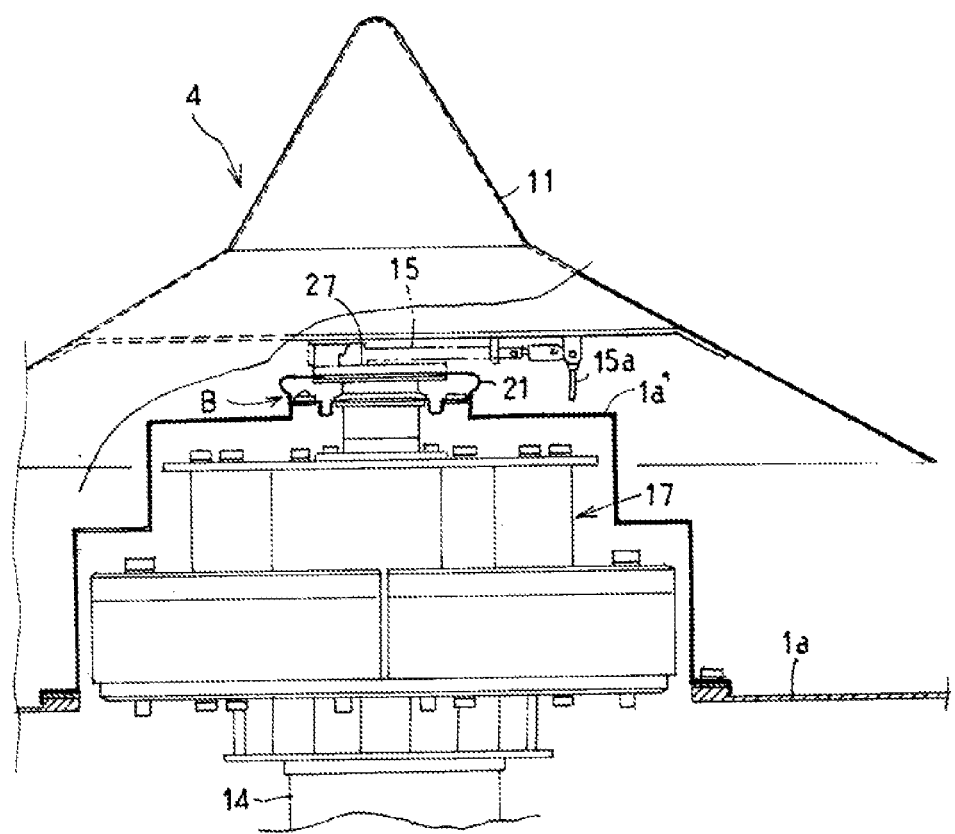
FIG. 9 is a longitudinal cross-sectional view of a sealing structure for the dispersion feeder.

The sealing structure B may also be used to block any fluid from entering the dispersion feeder 4. In FIG. 9 is illustrated the sealing structure B disposed in the dispersion feeder-mounted portion.

In a center part of the top plate 1a of the center base body 1, the top plate raised portion 1a', which is made of a different material, is disposed in a manner that protrudes upward to a large extent, as illustrated in FIG. 9. The vibrator 12 has a vibrating head 27 and is housed in the top plate raised portion 1a'. This vibrating head 27 is disposed in a manner that protrudes upward out of the center opening formed in the upper surface of the top plate raised portion 1a'. The top cone 11 is coupled to an upper end of the vibrating head 27 through the buckle-type coupling jig 15. The same bellows 21 as in the sealing structure B for the linear feeders 5 is fitted to between the protruding portion of the vibrating head 27 and the upper surface of the top plate raised portion 1a' in the same manner as the linear feeders 5.

Other Embodiments

Figure 10:
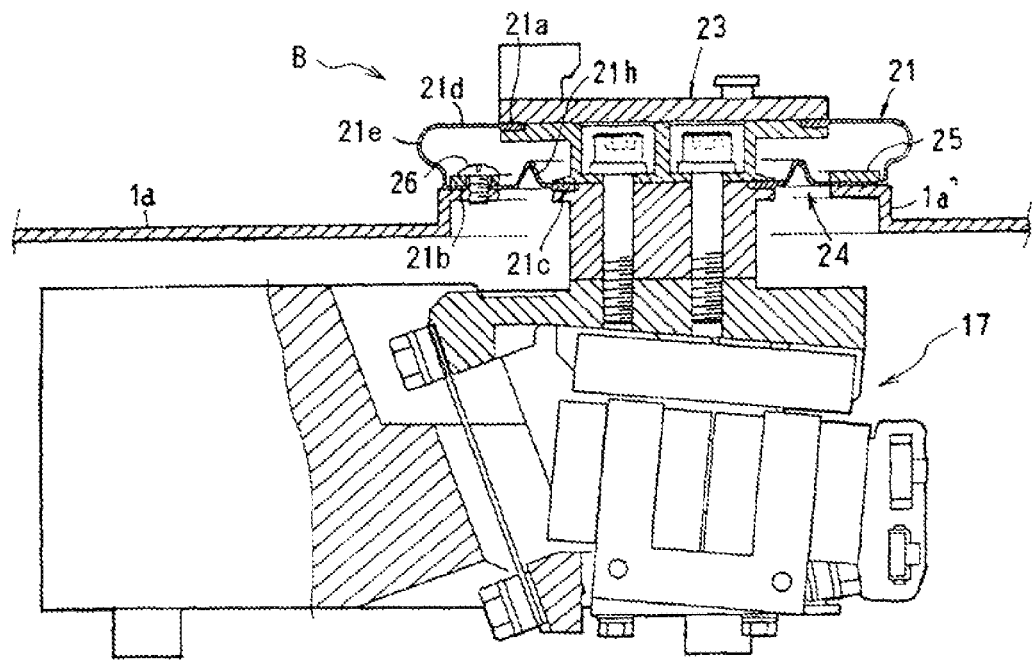
FIG. 10 is a longitudinal cross-sectional view of a sealing structure according to another embodiment of this invention.
Figure 11:
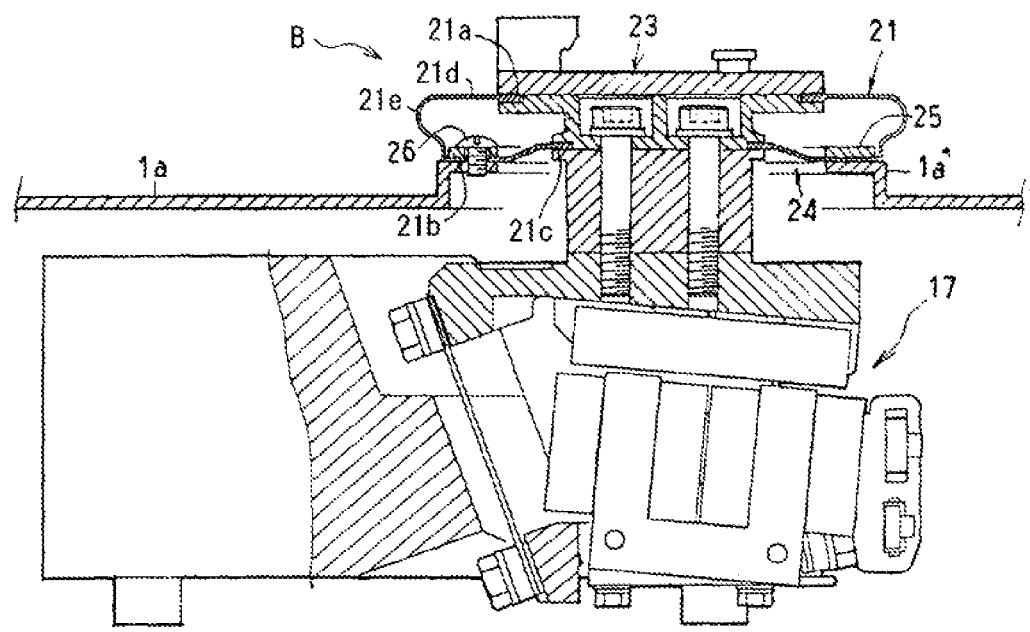
FIG. 11 is a longitudinal cross-sectional view of a sealing structure according to yet another embodiment of this invention.
Figure 1:
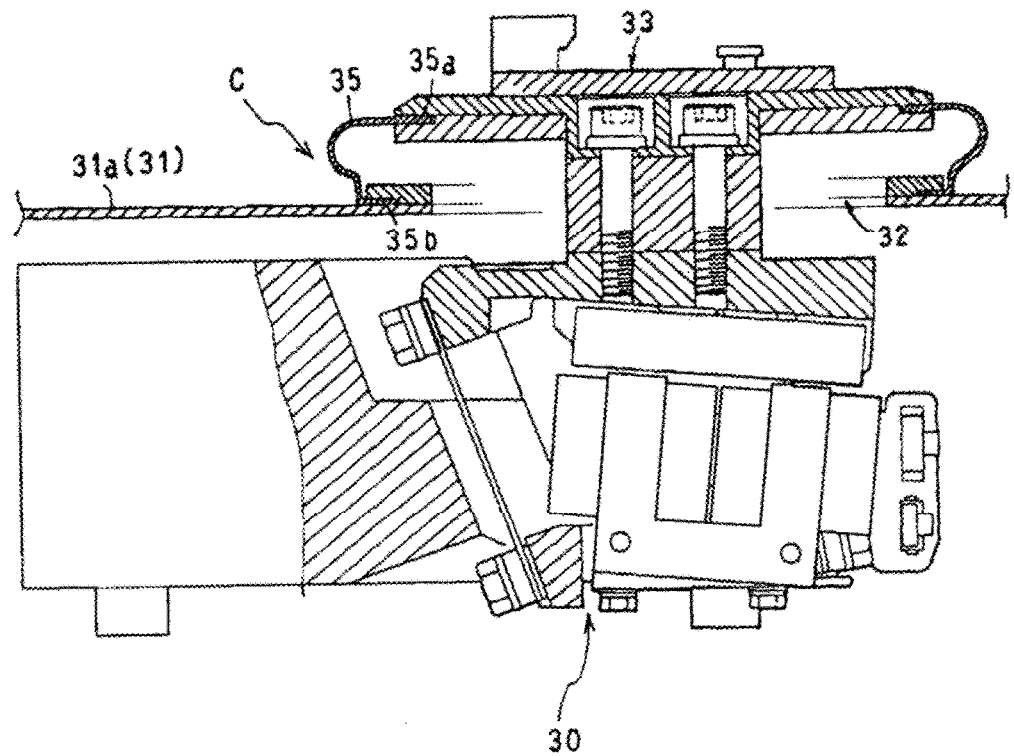

The scope of this invention may include the following modes.
1] The bellows 21 may desirably be visually checkable to see what is occurring inside. This, however, is not an indispensable requirement, insofar as the sealing structure B can be disassembled at the time of routine checkup for events like water penetration and/or water retention in the groove 21f.
2] As illustrated in FIG. 10, an upward projection 21h; an example of the deformable bent portion, may be formed between the intermediate coupler 21b and the lower coupler 21c of the bellows 21. This may successfully block cleaning water, if it penetrated into the bellows 21, from further running toward and reaching the lower coupler 21b. This structural feature may also control the vibrations of the vibrating head 23 from transmitting to the top plate raised portion 1a' and also to the top plate 1a.
3] As illustrated in FIG. 11, the intermediate coupler 21b of the bellows 21 may be inclined in a manner that rises by degrees toward the lower coupler 21c. Thus, cleaning water, if it penetrated into the bellows 21, may be successfully blocked from further running toward and reaching the lower coupler 21c.
4] The sealing structure of this invention available for combination scales may be applicable to a plurality of linear feeders that are horizontally arranged in a row, instead of multiple weighing units that are circularly arranged.
5] The sealing structure of this invention may also be useful as a water blocking means in any apparatuses that vibrationally transport articles using a linear feeder (s) alone.

REFERENCE SIGNS LIST 1 cabinet (center base body)
1a top plate
1a' top plate raised portion
4 dispersion feeder
5 linear feeder
6 feeding hopper
7 weighing hopper
11 top cone
12 vibrator
13 vibrating head
16 trough
17 vibrator
21 bellows (sealing member)
21a upper coupler
21b intermediate coupler
21c lower coupler
21d upper surface portion
21e bulging portion
21f groove (deformable bent portion)
23 vibrating head
A weighing apparatus (combination scale)
B sealing structure

The invention claimed is:
1. A sealing structure, comprising a sealing member having an annular shape and elastically deformable,
the sealing member being interposed between a top plate of a cabinet mounted with a vibrator and a vibrating head of the vibrator disposed in a manner that protrudes upward out of an opening of the top plate,
the sealing member comprising an upper coupler, an intermediate coupler continuous to the upper coupler, and a lower coupler continuous to the intermediate coupler,
the upper coupler being couplable to an upper part of the vibrating head, the intermediate coupler being couplable to the top plate, the lower coupler being couplable to a lower part of the vibrating head,
the sealing member comprising a deformable bent portion between the intermediate coupler and the lower coupler, the deformable bent portion serving to block flow of water from the intermediate coupler to the lower coupler,
the sealing member being configured to be coupled to the upper and lower parts of the vibrating head and to the top plate without being engaged by any other member.
2. The sealing structure according to claim 1, wherein the sealing member comprises a bulging portion deformable outward between the upper coupler and the intermediate coupler.
3. The sealing structure according to claim 1, wherein the deformable bent portion is a groove.
4. The sealing structure according to claim 2, wherein the deformable bent portion is a groove.
5. The sealing structure according to any one of claims 1, 2, 3 and 4, wherein
the sealing member comprises a transparent or translucent material.
6. The sealing structure according to any one of claims 1, 2, 3 and 4, wherein
the top plate of the cabinet partly includes a raised portion, and
the intermediate coupler of the sealing member is coupled to an upper surface of the raised portion.
7. A weighing apparatus, comprising:
a center base body including a top plate and used as a cabinet;
a dispersion feeder; and
a plurality of linear feeders each having a trough,
the dispersion feeder and the linear feeders being disposed in an upper part of the center base body, the dispersion feeder radially dispersing and transporting articles, the linear feeders transporting, further outward, the articles dispersed and transported by the dispersion feeder,
the weighing apparatus further comprising a plurality of feeding hoppers and a plurality of weighing hoppers that are disposed in an outer circumference of the center base body, the feeding hoppers temporarily retaining and then discharging the articles received from the linear feeders, the weighing hoppers retaining and weighing the articles discharged from the feeding hoppers,
the center base body being mounted with a vibrator for the linear feeders, the vibrator comprising a vibrating head disposed in a manner that protrudes upward out of an opening of the top plate,
the troughs of the linear feeders being mounted to the vibrating head of the vibrator,
the weighing apparatus further comprising the sealing structure according to claim 5 in which the sealing member is interposed between the vibrating head of the vibrator for the linear feeders and the top plate of the center base body.

8. The weighing apparatus according to claim 7, wherein the center base body is mounted with a vibrator for the dispersion feeder, the vibrator comprising a vibrating head disposed in a manner that protrudes upward out of the opening of the top plate, the top cone of the dispersion feeder is mounted to the vibrating head of the vibrator, and the weighing apparatus further comprises a sealing structure comprising a sealing member having an annular shape and elastically deformable and being interposed between the vibrating head of the vibrator for the dispersion feeder and the top plate of the center base body, the sealing member comprising an upper coupler, an intermediate coupler continuous to the upper coupler, and a lower coupler continuous to the intermediate coupler, the upper coupler being couplable to an upper part of the vibrating head, the intermediate coupler being couplable to the top plate, the lower coupler being couplable to a lower part of the vibrating head, the sealing member comprising a deformable bent portion between the intermediate coupler and the lower coupler, the deformable bent portion serving to block flow of water from the intermediate coupler to the lower coupler.

9. A weighing apparatus, comprising:

a center base body including a top plate and used as a cabinet;

a dispersion feeder; and a plurality of linear feeders each having a trough, the dispersion feeder and the linear feeders being disposed in an upper part of the center base body, the dispersion feeder radially dispersing and transporting articles, the linear feeders transporting, further outward, the articles dispersed and transported by the dispersion feeder, the weighing apparatus further comprising a plurality of feeding hoppers and a plurality of weighing hoppers that are disposed in an outer circumference of the center base body, the feeding hoppers temporarily retaining and then discharging the articles received from the linear feeders, the weighing hoppers retaining and weighing the articles discharged from the feeding hoppers, the center base body being mounted with a vibrator for the linear feeders, the vibrator comprising a vibrating head disposed in a manner that protrudes upward out of the opening of the top plate, the troughs of the linear feeders being mounted to the vibrating head of the vibrator, the weighing apparatus further comprising the sealing structure according to claim 6 in which the sealing member is interposed between the vibrating head of the vibrator for the linear feeders and the top plate of the center base body.

10. The weighing apparatus according to claim 9, wherein the center base body is mounted with a vibrator for the dispersion feeder, the vibrator comprising a vibrating head disposed in a manner that protrudes upward out of the opening of the top plate, the top cone of the dispersion feeder is mounted to the vibrating head of the vibrator, and the weighing apparatus further comprises a sealing structure comprising a sealing member having an annular shape and elastically deformable and being interposed between the vibrating head of the vibrator for the dispersion feeder and the top plate of the center base body, the sealing member comprising an upper coupler, an intermediate coupler continuous to the upper coupler, and a lower coupler continuous to the intermediate coupler, the upper coupler being couplable to an upper part of the vibrating head, the intermediate coupler being couplable to the top plate, the lower coupler being couplable to a lower part of the vibrating head, the sealing member comprising a deformable bent portion between the intermediate coupler and the lower coupler, the deformable bent portion serving to block flow of water from the intermediate coupler to the lower coupler.

* * * * *